(12) United States Patent
Maeda et al.

(10) Patent No.: US 6,450,676 B2
(45) Date of Patent: Sep. 17, 2002

(54) VEHICLE LAMP DEVICE

(75) Inventors: Tarou Maeda; Arihiro Furumoto; Kazuma Kondou, all of Hiroshima-Ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/773,930

(22) Filed: Feb. 2, 2001

(30) Foreign Application Priority Data

Feb. 7, 2000 (JP) .......................... 2000-029234

(51) Int. Cl.⁷ ............................. F21V 25/02; F21V 15/04
(52) U.S. Cl. ...................... 362/549; 362/369; 362/546; 362/496
(58) Field of Search ................................ 362/369, 390, 362/450, 487, 496, 505, 512, 523, 527, 546, 549

(56) References Cited

U.S. PATENT DOCUMENTS 4,475,148 A * 10/1984 Tomforde ................... 362/549
5,597,232 A * 1/1997 Ohashi et al. ............... 362/369
6,190,030 B1 * 2/2001 Chase ......................... 362/549

FOREIGN PATENT DOCUMENTS

| JP | 402237831 A | * | 9/1990 | ................. 362/390 |
| JP | 403208738 A | * | 9/1991 | ................. 362/505 |
| JP | 09-030321 A |   | 2/1997 |                          |

* cited by examiner

Primary Examiner—Alan Cariaso
(74) Attorney, Agent, or Firm—Nixon Peabody LLP; Donald R. Studebaker (57) ABSTRACT

The present invention provides a vehicle lamp device capable of relieving the impact acting from the vehicle lamp device to an obstacle, and thereby achieving a simple and relatively spaceless structure. The vehicle lamp device comprises a thin grooved portion 17 (a displacement allowing structure) for allowing the housing 3 to be displaced. The displacement allowing structure is provided in an interfering portion of the housing 3 interfering with a front side frame 16 (a vehicle body member) which locates in the displacement area where the housing 3 is displaced and interrupts the housing 3 to be displaced when the vehicle lamp device collides with an obstacle.

26 Claims, 5 Drawing Sheets

VEHICLE LAMP DEVICE

FIELD OF THE INVENTION

The present invention relates to a vehicle lamp device, more particularly to a vehicle lamp device illuminating forward which includes a housing displaceable rearward when the vehicle lamp device collides with an obstacle.

BACKGROUND OF THE INVENTION

A vehicle lamp device includes a headlamp, fog lamp, and turn signal lamp at the front end of a vehicle as well as a tail lamp, stop lamp, turn signal lamp at the rear end of the vehicle. In such vehicle lamp devices, the headlamp and the fog lamp at the front end of the vehicle are specifically provided for enhancing the visibility to road ahead and obstacles (objects) on road when the vehicle is running at night, in a tunnel, or in a limited visibility under bad weather.

In late years, in order to relieve the impact against an obstacle in the collision with an obstacle, some vehicle lamp devices have been proposed in which the front end of a lens of the vehicle lamp device and the surface of a bumper provided at the front end of a vehicle are aligned approximately in the longitudinal direction of the vehicle, and when the vehicle lamp device collides with an obstacle on a road, the vehicle lamp device is adapted to be able to move rearward with the obstacle to relieve the impact against the obstacle. For example, the Japanese Patent Laid-Open Publication No. Hei 9-30321 discloses a vehicle lamp device comprising a lens disposed at the front end of a vehicle, and a housing supporting the periphery of rear end of the lens, wherein the housing accommodates a reflector, a bulb and others therein. A pair of upper and lower inclinable stays is coupled with a vehicle body, and a slit is formed in each end portion of the inclinable stays. A pair of upper and lower brackets is also secured to the rear end portion of the housing, and an engaging pin is attached to each the bracket wherein each the slit (engaged portion) of inclinable stays is releasably engaged with corresponding the engaging pin. In a normal condition, the inclinable stays are kept in their approximately vertical posture to maintain the engagement of the engaging pins and the slits. For example, in the collision with an obstacle, each inclinable stay inclines or rotates to its approximately horizontal position to allow the housing and the lens to move rearward on the downward decline, and each the engaging pin will be eventually released from corresponding the slit.

The vehicle lamp device of the Japanese Patent Laid-Open Publication No. Hei 9-30321 moves rearward on the downward decline relatively to the inclinable stays in the collision with the obstacle. However, immediately after the engaging pins are released from the slits, a part of the lens or the housing tends to interfere with a vehicle body member (e.g. a front side frame) or the lower inclinable stay. Thus, for allowing the vehicle lamp device to be moved rearward, it is required to provide an adequate space on the rear side of the vehicle lamp device. This is disadvantageous to design the layout of vehicle body members and various vehicle equipments.

Moreover, necessity of the inclinable stays, brackets, and engaging pins causes increased number of parts and complexity of the structure. In assembling the vehicle lamp device, a lot of labor is also required to make the inclinable stays rotate from the horizontal posture to the vertical setting posture with maintaining the engagement of the inclinable stays and the slits.

SUMMARY OF THE INVENTION

It is an object of the present invention to provide a vehicle lamp device capable of relieving the impact acting from the vehicle lamp device to an obstacle in the colliding, and to provide a simple and relatively spaceless structure for the vehicle lamp device.

According to a primary aspect of the present invention, a vehicle lamp device including a housing supported to the front portion of a vehicle, the vehicle lamp device comprising a displacement allowing structure for allowing the housing to be displaced, the displacement allowing structure provided in an interfering portion of the housing interfering with a vehicle body member which locates in the displacement area where the housing is displaced and interrupts the housing to be displaced when the vehicle lamp device collides with an obstacle.

The displacement allowing structure may apply a thin grooved portion provided to surround the interfering portion of the housing or a thin-walled portion provided over approximately entire region of the interfering portion of the housing.

When the impact force in the collision with an obstacle is not lower than a certain level, the housing is displaced rearward on the downward decline due to, for example, departing or breakage of the mounted portion of the housing to the vehicle body member. At the same time, when the interfering portion of the housing interferes with the vehicle body member located in the displacement area of the housing, the displacement allowing structure allows the housing to be displaced. This achieves longer moving distance of the vehicle lamp device so that the impact acting from the vehicle lamp device to the obstacle may be significantly relieved. As compared to the conventional vehicle lamp device disclosed in the aforementioned publication, the vehicle lamp device of the present invention may be reduce in the number of parts and may achieve a simple structure. Further, since the structure makes the housing move rearward with allowing the interfering portion of the housing to be interfered with the vehicle body member, sufficient flexibility in space may be advantageously achieved.

In one embodiment according to the primary aspect of the present invention, the displacement allowing structure may be a thin grooved portion provided to surround the interfering portion of the housing and formed to be thinner than other portion of the housing. In the colliding with an obstacle, when the interfering portion of the housing interferes with the vehicle body member located in the displacement area, the thin grooved portion as the displacement allowing structure is broken to allow the housing to be displaced rearward. Thus, the impact acting from the vehicle lamp device to the obstacle may be relieved.

In another embodiment according to the primary aspect of the present invention, the displacement allowing structure may be a thin-walled portion provided over approximately entire region of the interfering portion of the housing and formed to be thinner than other portion of the housing. In the colliding with an obstacle, when the interfering portion of the housing interferes with the vehicle body member located in the displacement area, the thin-walled portion as the displacement allowing structure is broken to allow the housing to be displaced rearward. Thus, the impact acting from the vehicle lamp device to the obstacle may be relieved.

In yet another embodiment according to the primary aspect of the present invention, the displacement allowing structure may be a low strength portion provided over approximately entire region of the interfering portion of the housing and formed of a material different from that of other portion of the housing to have a lower strength than that of the other portion of the housing. In the colliding with an obstacle, when the interfering portion of the housing interferes with the vehicle body member located in the displacement area, the low strength portion as the displacement allowing structure is broken to allow the housing to be displaced rearward. Thus, the impact acting from the vehicle lamp device to the obstacle may be relieved.

The aforementioned vehicle body member may be a front side frame. It is often the case that the front-end portion of the front side frame is disposed near the rearward of the vehicle lamp device. In this case, the vehicle lamp device of the present invention may also be applied.

The aforementioned housing includes a mounted portion mounted to a vehicle body, and the mounted portion may be adapted to be released from the vehicle body when the interfering portion of the housing interferes with the vehicle body member. This allows the mounted portion of the housing to the vehicle body to be released from the vehicle body and to be reliably displaced rearward when not lower than a certain level of impact force is acted to the housing in the collision with an obstacle.

DETAILED DESCRIPTION OF THE PREFERRED EMBODIMENTS

With reference to the drawings, embodiments of the present invention will now be described, An embodiment will be described as examples applying the present invention to a pair of right and left vehicle lamp devices 1 as headlamps provided in the front-end portion of a vehicle. In the following description, since the right and left vehicle lamp devices 1 have a symmetrically same structure respectively, the only one side of the vehicle lamp devices will be described. Further, frontward/rearward directions, and rightward/leftward directions with respect to a passenger riding in a car are defined as a longitudinal direction and a cross direction respectively.

As shown in FIGS. 1 to 4, the vehicle lamp device 1 comprises a lens 2 disposed at the front-end portion of the vehicle, a housing 3 supporting the periphery 2a of rear end of the lens 2 and secured to a vehicle body, and a displacement allowing structure formed on a part of the housing 3. In an interior space surrounded by the lens 2 and housing 3, a reflector 4, a bulb 5, and others are movably coupled with the housing 3 on the deep or rear side of the interior space. The bulb 5 united with the reflector 4 is coupled with the housing 3 through a ball joint 6 or the like, so as to make an optical axis of the vehicle lamp device adjustable in the vertical and cross directions from the back side of the vehicle lamp device.

Turning to the description of the lens 2, the lens 2 is made of glass or plastic in the form of approximately rectangular shape in front view and approximately " ⊂ " shape in sectional side view, and is disposed to make its opening face rearward. A flange 2b is formed on the periphery slightly frontward spaced from the periphery 2a of rear end of the lens 2. The front surface of the lens 2 is positioned to provide a certain space between the lower end of the front surface of the lens 2 and a bumper 7, and to align with the surface of the bumper 7. The upper end of the front surface of the lens 2 is positioned near the front end of the hood or bonnet 8 in the closed state. Thus, the front surface of the lens 2 is arranged to have a configuration slightly projecting frontward as going downward.

Turning to the description of the housing 3, as shown in FIGS. 2 to 5, the housing 3 is made of synthetic resin in the form of approximately rectangular shape in front view and approximately " ⊃ " shape in sectional side view. The housing 3 is also formed in a shape expanded rearward as going near the midpoint in the cross direction of the housing 3 to accommodate the reflector 4. Near the midpoint in the longitudinal direction of the periphery of the housing 3, mounted portions 9, 10 and 11 for mounting the housing 3 to the vehicle body are provided integrally in the housing 3 at the upper end and lower end portions of the left side wall of the housing 3 and the upper end portion of the right side wall of the housing 3, respectively. A mounted portion 12 for mounting the housing 3 to the vehicle body is also provided integrally in the housing 3 at the rear end portion of the upper wall portion in the outer periphery of the housing 3.

Each of the mounted portions 9, 10 and 11 is secured to a shroud panel (not shown) of the vehicle body by a bolt, and a notched portion as a bolt hole is provide by notching upward in each of the mounted portions 9, 10 and 11. The mounted portion 12 is secured to an upper shroud 13 of the vehicle body by bolt 14, and a notched portion (see FIG. 5) as a bolt hole is provided by notching rearward in the mounted portions 12. When not lower than a certain level of impact force is acted to the housing in the collision with an obstacle, the mounted portions 9, 10 and 11 are released from the shroud panel and the bolts, and mounted portion 12 is also released from the upper shroud 13 and the bolt 14.

The front end of the housing 3 is formed with an annular lens periphery supporting portion 3a having a " ⊃ " shaped section. The lens periphery supporting portion 3a and the periphery 2a of the lens 2 are water-tightly fixed each other by a hot melt seal 15 filled in an annular space therebetween.

Figure 1:
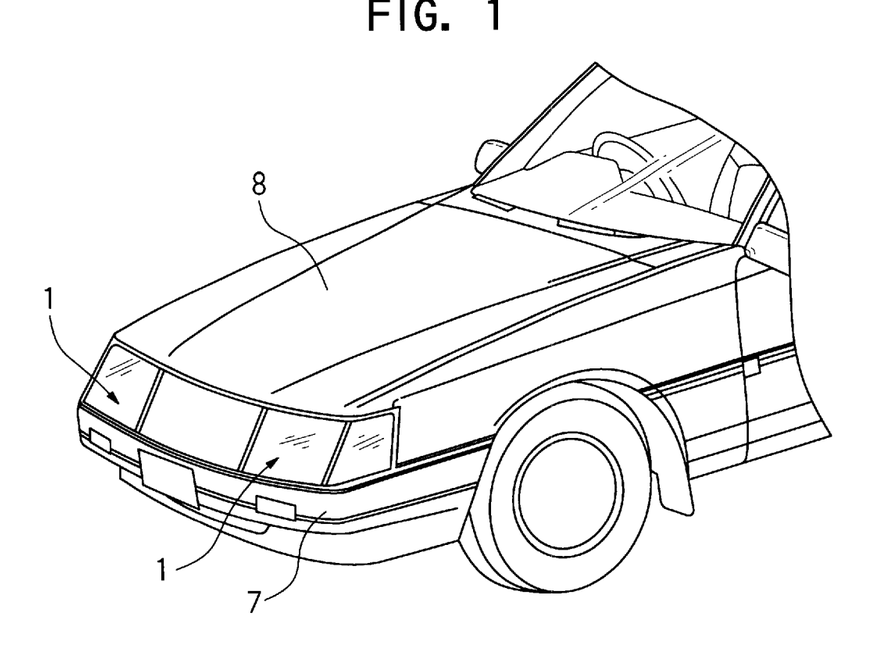
FIG. 1 is a perspective view showing a vehicle lamp device mounted to a vehicle, according to an embodiment of the present invention.
Figure 2:
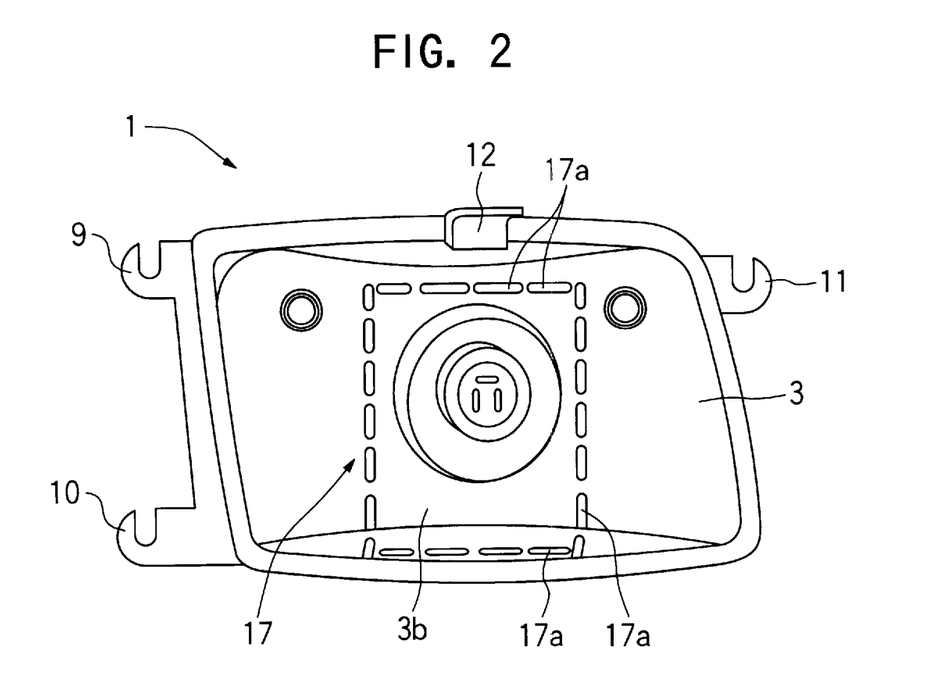
FIG. 2 is a rear view of the vehicle lamp device.
Figure 3:
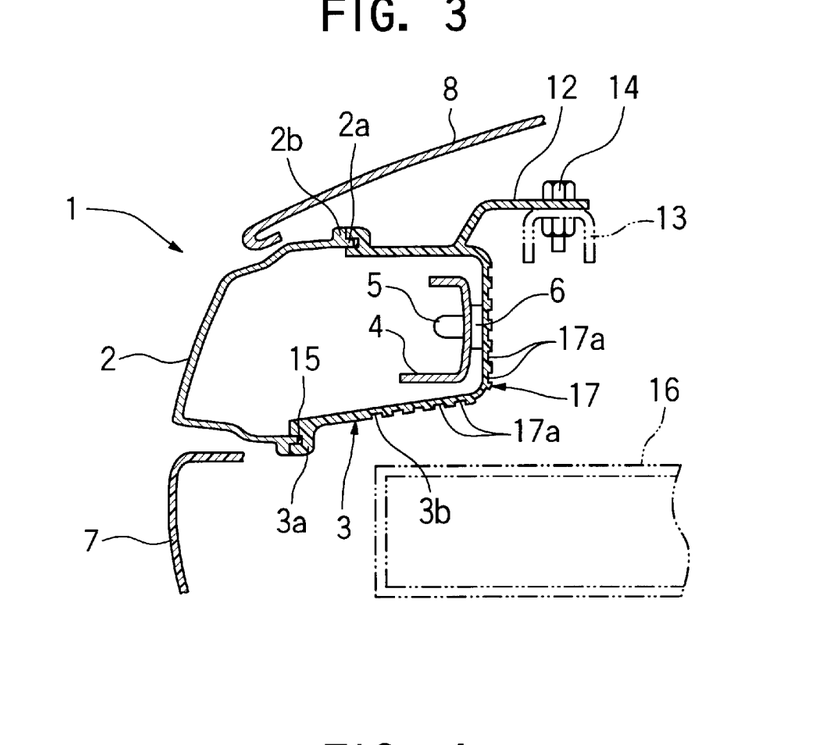
FIG. 3 is a vertical sectional view showing a physical relationship of a lens, a housing, and a vehicle body member.
Figure 4:
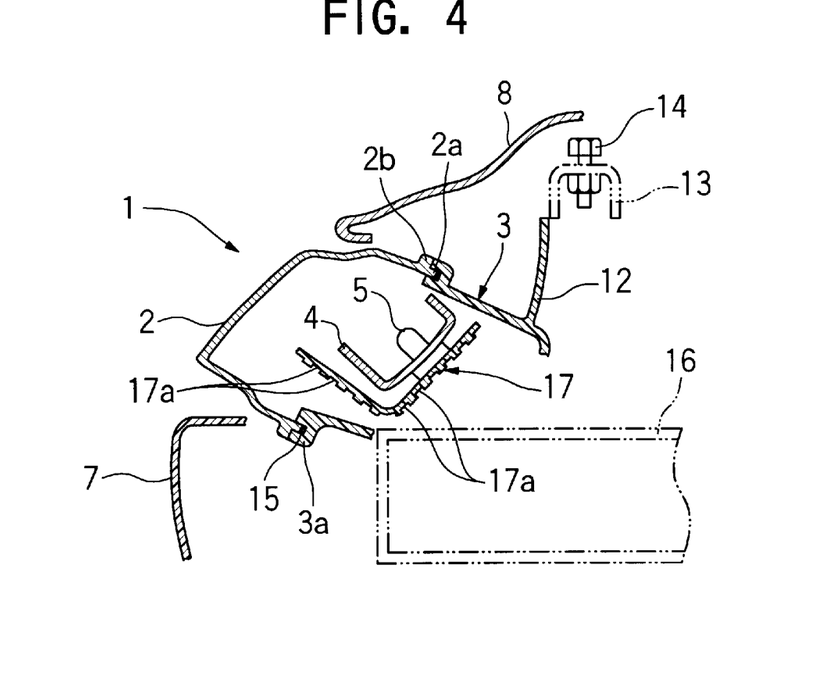
FIG. 4 is a vertical sectional view showing the state where the vehicle lamp device has moved rearward after the breakage of a thin grooved portion in a collision.
Figure 5:
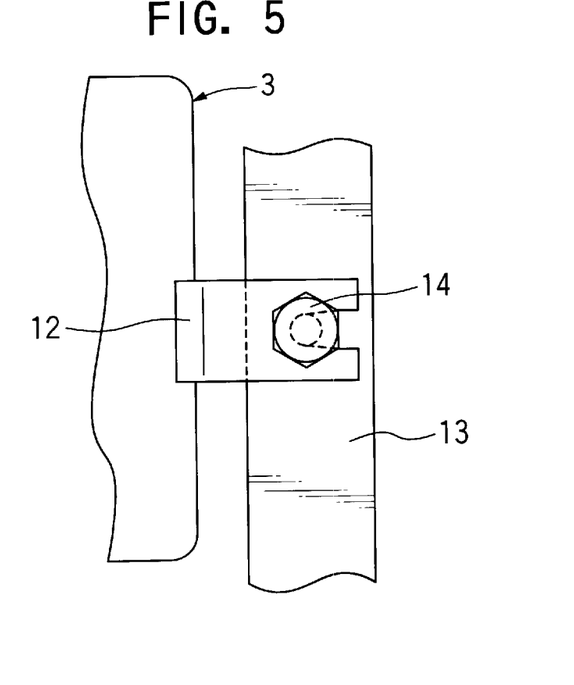
FIG. 5 is a partially enlarged plan view showing a mounted portion of the housing mounted to a vehicle body.

Turning to the description of the displacement allowing structure, as shown in FIGS. 2 to 4, in an interfering portion 3b of said housing 3 interfering with a front side frame 16 as a vehicle body member which locates in the displacement area where the housing 3 is displaced and interrupts the housing 3 to be displaced in the collision with an obstacle, a thin grooved portion 17 as a displacement allowing structure for allowing the housing 3 to be displaced is provided. The thin grooved portion 17 comprises a plurality of shallow and short unitary grooves 17a continually surrounding the interfering portion 3b of the housing 3 in the form of a rectangular frame. The plural unitary grooves 17a are spaced apart each other by about 2.3 mm of distance.

The thin grooved portion 17 is formed in a rectangular frame from the rear wall portion to the lower wall portion of the housing 3. When not lower than a certain level of impact force is acted to the housing 3 in the collision with an obstacle, the interfering portion 3b of the housing 3 collides with the upper end of the front-end portion of the front side frame 16. Then, the thin grooved portion 17 is broken to allow the interfering portion 3b to be displaced into the interior space surrounded by the lens 2 and the remaining major part of the housing 3 (FIG. 4).

Functions of this vehicle lamp device 1 will now be described.

As shown in FIG. 4, in the collision with an obstacle (including a pedestrian), when the impact force is not lower than a certain level, the mounted portions 9, 10 and 11 are released from the shroud panel and the bolts through the notch portions, and the mounted portion 12 is also released from the shroud upper panel 13 and the bolt 14 through the notch portion.

At the same time, the interfering portion 3b of the housing 3 interferes with the upper end of the front-end portion of the front side frame 16. Then, the thin grooved portion 17 as the displacement allowing structure is broken to allow the interfering portion 3b to be displaced into the interior space surrounded by the lens 2 and the remaining major part of the housing 3. This causes the major part of the vehicle lamp device 1 to be largely moved rearward on the downward decline relatively to the front side frame 16. Depending on the situation, the hood 8 and others are also deformed.

Thus, in the colliding, even if the housing 3 interferes with the vehicle body member such as the front side frame 16, the vehicle lamp device 1 is not interrupted to move rearward, and the vehicle lamp device 1 may assure larger distance to be moved rearward, so that the impact acting from the vehicle lamp device 1 to the obstacle may be reliably relieved. As compared to the conventional vehicle lamp device disclosed in the aforementioned publication, the vehicle lamp device of the present invention may be reduce in the number of parts and may achieve a simple structure. Specifically, this vehicle lamp device may be readily assembled only by mounting the mounted portions 9 to 12 of the housing 3 to the shroud panel and the shroud upper panel 13 through the bolts so that the manufacturing cost is not particularly high. Further, an extra space is not required to make the vehicle lamp device 1 move rearward, and this is advantageous to design the vehicle body and the layout of vehicle equipments.

Other vehicle lamp devices as modifications including a partial change to the embodiment will now be described. In these modifications, the same elements as the embodiment described above are defined by the same reference numbers, and their description will be omitted.

Figure 6:
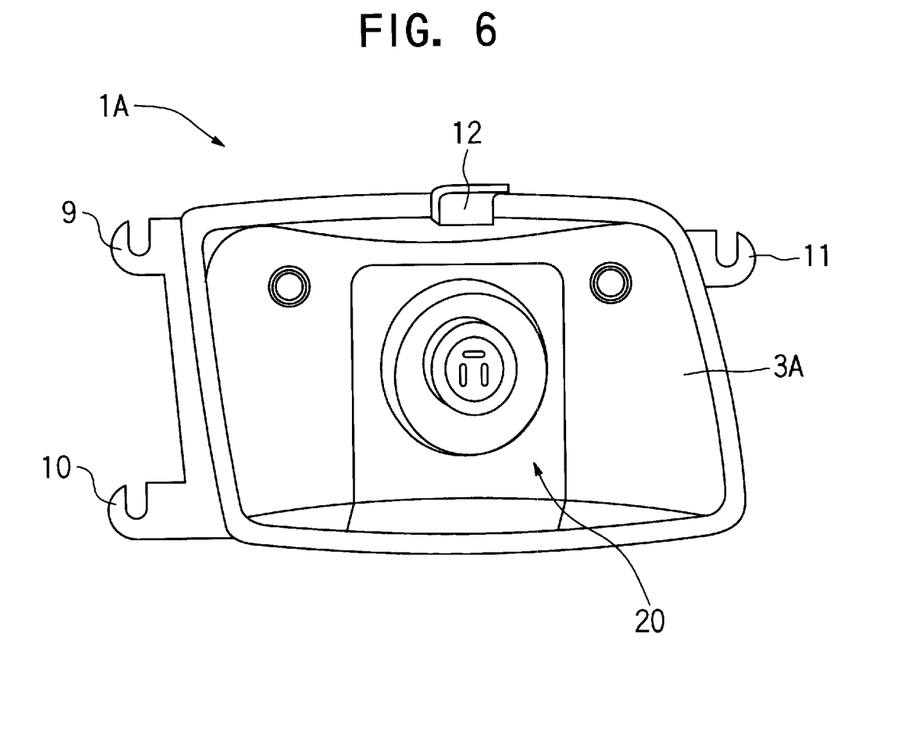
FIG. 6 is a view corresponding to FIG. 2, showing a first modified embodiment.
Figure 7:
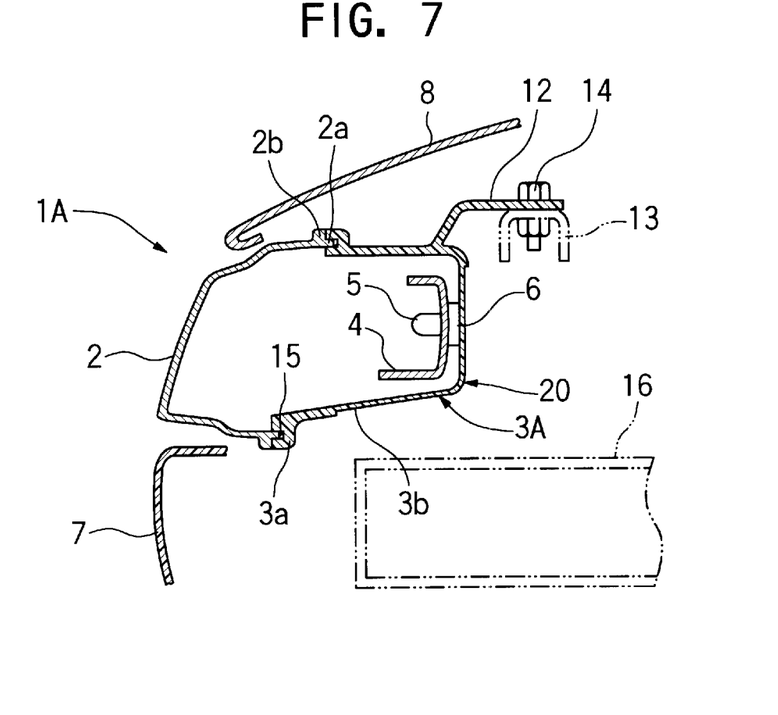
FIG. 7 is a view corresponding to FIG. 3, showing a first modified embodiment.
Figure 8:
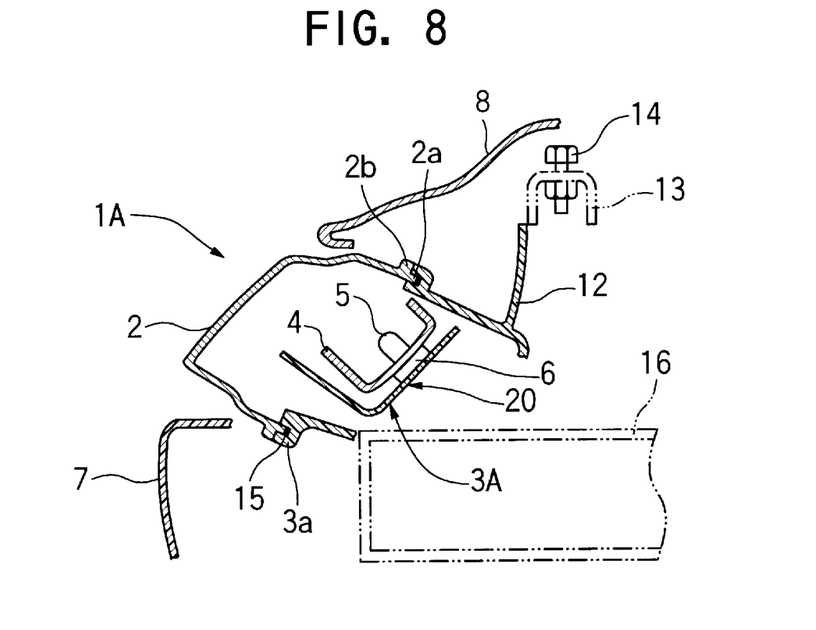
FIG. 8 is a view corresponding to FIG. 4, showing a first modified embodiment.

1) Modification 1 (see FIGS. 6 to 8)

As to a vehicle lamp device 1A, a thin-walled portion 20 as the displacement allowing structure for allowing a housing 3A to be displaced rearward in the colliding is provided over approximately entire region of the interfering portion 3b of the housing 3A interfering with the front side frame 16 which locates in the displacement area where the housing 3A is displaced and interrupts the housing 3A to be displaced in the collision. This thin-walled portion 20 is provided from the rear wall portion to the lower wall portion of the housing 3A in the form of rectangular and is formed to be thinner than other portion of the housing 3A. Other structures are identical with the embodiment described above.

The interfering portion 3b of the housing 3A, i.e. the thin-walled portion 20, is adapted to be broken by interfering with the upper end of the front-end portion of the front side frame 16 and to be got into the interior space surrounded by the lens 2 and the remaining major part of the housing 3A, when not lower than a certain level of impact force is acted to the housing in the collision with an obstacle (see FIG. 8). Basically, this vehicle lamp device 1A has similar functions and effects as the embodiment described above.

Figure 9:
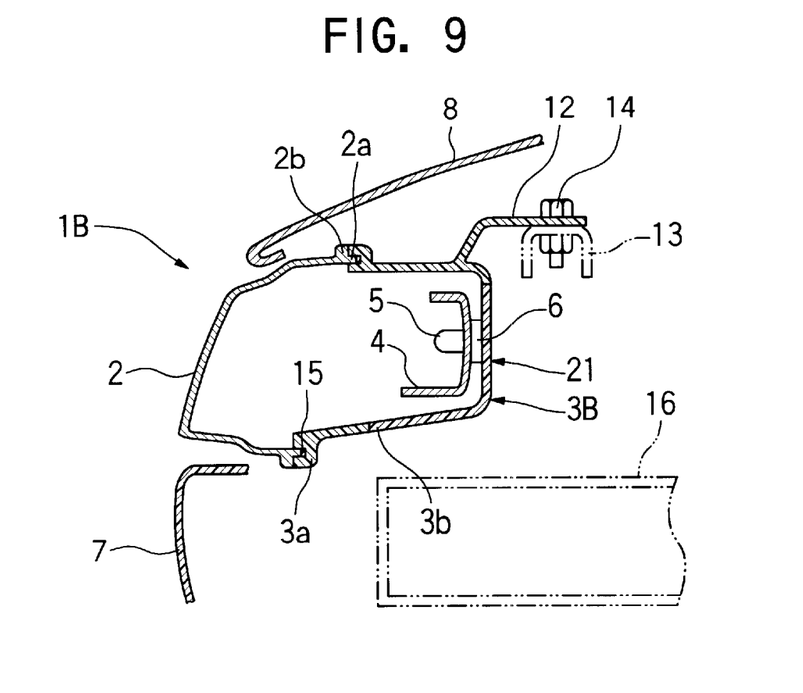
FIG. 9 is a view corresponding to FIG. 3, showing a second modified embodiment.
Figure 10:
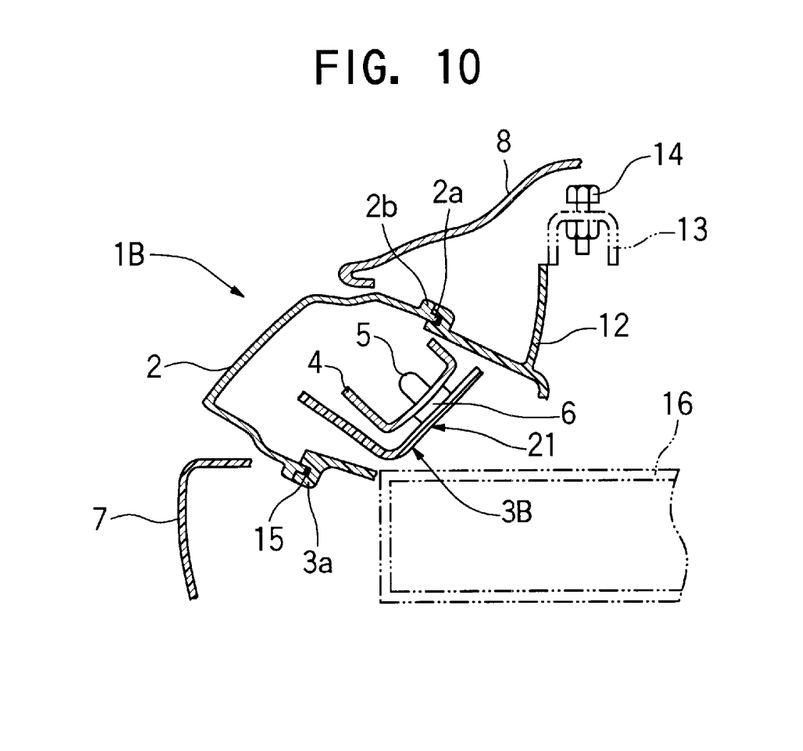
FIG. 10 is a view corresponding to FIG. 4, showing a second modified embodiment.

2) Modification 2 (see FIGS. 6, 9 and 10)

As to a vehicle lamp device 1B, a low strength portion 21 as the displacement allowing structure for allowing a housing 3B to be displaced rearward in the colliding is provided over approximately entire region of the interfering portion 3b of the housing 3B interfering with the front side frame 16 which locates in the displacement area where the housing 3B is displaced and interrupts the housing 3B to be displaced in the collision. This low strength portion 21 is provided from the rear wall portion to the lower wall portion of the housing 3B in the form of rectangular and is formed of a material different from that of other portion of the housing 3B to have a lower strength than that of the other portion of the housing 3B.

A two-stage molding process is applied to form the housing 3B: a portion of the housing 3B other than the low strength portion 21 is first molded, and immediately after this molding, the low strength portion 21 is molded before the molded product is not cured, so as to form the integrated housing 3B.

The interfering portion 3b of the housing 3B, i.e. the low strength portion 21, is adapted to be removed by interfering with the upper end of the front-end portion of the front side frame 16 and to be got into the interior space surrounded by the lens 2 and the remaining major part of the housing 3B, when not lower than a certain level of impact force is acted to the housing in the collision with an obstacle (see FIG. 10). Basically, this vehicle lamp device 1B has similar functions and effects as the embodiment described above.

For the displacement allowing structure of the vehicle lamp device 1, a continually extending thin grooved portion may substitute for a plurality of the unitary grooves 17a spaced apart each other as in the aforementioned thin grooved portion. The thin grooved portion is not limited to the structure surrounded by the rectangular frame shape, and various types of surrounding frame shapes may be applied. Similarly, the thin-walled portion 20 and the low strength portion 21 are not limited to the rectangular shape, and various shapes may be applied. Furthermore, various changes and modifications may be made to respective embodiments described above without departing from the spirit and scope of the present invention.

According to the present invention, when not lower than a certain level of impact force is acted to the housing in the colliding, even if the housing is declined slightly downward and interferes with the vehicle body member, the housing is allowed to be displaced rearward, and thereby the vehicle lamp device is allowed to be moved rearward, so that the impact acting from the vehicle lamp device to the obstacle may be reliably and effectively relieved. As compared to the conventional vehicle lamp device disclosed in the aforementioned publication, the vehicle lamp device of the present invention may be reduce in the number of parts and may achieve a simple structure. Thus, the mounted portion of the housing is readily assembled to the vehicle body so that lower manufacturing cost may be achieved.

Further, an extra space is not required to make the vehicle lamp device move rearward. This yields flexibility in design and is advantageous for layout of vehicle equipments.

When the thin grooved portion is applied as the displacement allowing structure, simpler structure and lower manufacturing cost may be obtained in addition to the aforementioned effects. When the thin-walled portion is applied as the displacement allowing structure, simpler structure and lower manufacturing cost may also be obtained in addition to the aforementioned effects.

Further, when the low strength portion is applied as the displacement allowing structure, simpler structure and lower manufacturing cost may also be obtained in addition to the aforementioned effects. When the interfering portion of the housing is adapted to interfere with the front side frame as the vehicle body member, the vehicle lamp device of the present invention may also be applied to most commercially available cars, because it is often the case that the front-end portion of the front side frame is disposed near the rearward of the vehicle lamp device. In this case, the same effect as described above may be obtained.

When the mounted portion is adapted to be released from the vehicle body when the interfering portion of the housing interferes with said vehicle body member, the housing may be reliably displaced rearward by allowing the mounted portion of the housing to the vehicle body to be released when not lower than a certain level of impact is acted to the housing in the collision with an obstacle. Thus, the displacement allowing structure may reliably function. In this case, the same effect as described above may be obtained.

What is claimed is:

1. A vehicle lamp device including a housing supported to the front portion of a vehicle, said vehicle lamp device comprising a displacement allowing structure provided in an interfering portion of said housing interfering with a vehicle body member which locates in the displacement area where said housing is displaced and interrupts said housing to be displaced when said vehicle lamp device collides with an obstacle, and said displacement allowing structure being broken to allow said interfering portion to move into the interior space of said vehicle lamp device when said vehicle lamp device collides with an obstacle.

2. A vehicle lamp device as defined in claim 1, wherein said displacement allowing structure is a thin grooved portion provided to surround said interfering portion of said housing and formed to be thinner than other portion of said housing.

3. A vehicle lamp device as defined in claim 1, wherein said displacement allowing structure is a thin-walled portion provided over approximately entire region of said interfering portion of said housing and formed to be thinner than other portion of said housing.

4. A vehicle lamp device as defined in claim 1, wherein said displacement allowing structure is a low strength portion provided over approximately entire region of said interfering portion of said housing and formed of a material different from that of other portion of said housing to have a lower strength than that of said other portion.

5. A vehicle lamp device as defined in claim 1, wherein said vehicle body member is a front side frame.

6. A vehicle lamp device as defined in claim 1, wherein said housing includes a mounted portion mounted to a vehicle body, wherein said mounted portion is adapted to be released from said vehicle body when said interfering portion of said housing interferes with said vehicle body member.

7. A vehicle lamp device as defined in claim 1, wherein said lamp device is a headlamp having a lens in front of said housing.

8. A vehicle lamp device as defined in claim 1, wherein said housing is formed of synthetic resin.

9. A vehicle lamp device as defined in claim 2, wherein said thin grooved portion comprises a plurality of unitary grooves spaced apart each other.

10. A vehicle lamp device as defined in claim 6, wherein said mounted portion includes a notched portion, wherein said housing is mounted to said vehicle body through said notched portion.

11. A vehicle lamp device including a housing supported to the front portion of a vehicle, said vehicle lamp device comprising a displacement allowing structure for allowing said housing to be displaced, said displacement allowing structure provided in an interfering portion of said housing interfering with a vehicle body member which locates in the displacement area where said housing is displaced and interrupts said housing to be displaced when said vehicle lamp device collides with an obstacle, wherein said displacement allowing structure is a thin grooved portion provided to surround said interfering portion of said housing and formed to be thinner than other portion of said housing.

12. A vehicle lamp device as defined in claim 11 wherein said vehicle body member is a front side frame.

13. A vehicle lamp device as defined in claim 11, wherein said housing includes a mounted portion mounted to a vehicle body, wherein said mounted portion is adapted to be released from said vehicle body when said interfering portion of said housing interferes with said vehicle body member.

14. A vehicle lamp device as defined in claim 11, wherein said housing is formed of synthetic resin.

15. A vehicle lamp device as defined in claim 11, wherein said thin grooved portion comprises a plurality of unitary grooves spaced apart each other.

16. A vehicle lamp device as defined in claim 13, wherein said mounted portion includes a notched portion, wherein said housing is mounted to said vehicle body through said notched portion.

17. A vehicle lamp device including a housing supported to the front portion of a vehicle, said vehicle lamp device comprising a displacement allowing structure for allowing said housing to be displaced, said displacement allowing structure provided in an interfering portion of said housing interfering with a vehicle body member which locates in the displacement area where said housing is displaced and interrupts said housing to be displaced when said vehicle lamp device collides with an obstacle, wherein said displacement allowing structure is a thin-walled portion provided over approximately entire region of said interfering portion of said housing and formed to be thinner than other portion of said housing.

18. A vehicle lamp device as defined in claim 17, wherein said vehicle body member is a front side frame.

19. A vehicle lamp device as defined in claim 17, wherein said housing includes a mounted portion mounted to a vehicle body, wherein said mounted portion is adapted to be released from said vehicle body when said interfering portion of said housing interferes with said vehicle body member.

20. A vehicle lamp device as defined in claim 17, wherein said housing is formed of synthetic resin.

21. A vehicle lamp device as defined in claim 19, wherein said mounted portion includes a notched portion, wherein said housing is mounted to said vehicle body through said notched portion.

22. A vehicle lamp device including a housing supported to the front portion of a vehicle, said vehicle lamp device comprising a displacement allowing structure for allowing said housing to be displaced, said displacement allowing structure provided in an interfering portion of said housing interfering with a vehicle body member which locates in the displacement area where said housing is displaced and interrupts said housing to be displaced when said vehicle lamp device collides with an obstacle, wherein housing includes a mounted portion mounted to a vehicle body, and wherein said mounting portion is adapted to be released from said vehicle body when said interfering portion of said housing interferes with said vehicle body member.

23. A vehicle lamp device as defined in claim 22, wherein said vehicle body member is a front side frame.

24. A vehicle lamp device as defined in claim 22, wherein said mounted portion includes a notched portion, wherein said housing is mounted to said vehicle body through said notched portion.

25. A vehicle lamp device including a housing supported to the front portion of a vehicle, said vehicle lamp device comprising a displacement allowing structure for allowing said housing to be displaced, said displacement allowing structure provided in an interfering portion of said housing interfering with a vehicle body member which locates in the displacement area where said housing is displaced and interrupts said housing to be displaced when said vehicle lamp device collides with an obstacle, wherein said displacement allowing structure is a low strength portion provided over approximately entire region of said interfering portion of said housing and formed of a material different from that of other portion of said housing to have a lower strength than that of said other portion, wherein housing includes a mounted portion mounted to a vehicle body, and wherein said mounting portion is adapted to be released from said vehicle body when said interfering portion of said housing interferes with said vehicle body member.

26. A vehicle lamp device as defined in claim 25, wherein said mounted portion includes a notched portion, wherein said housing is mounted to said vehicle body through said notched portion.

* * * * *